United States Patent
Buck et al.

(12)

(10) Patent No.: US 6,913,393 B2
(45) Date of Patent: Jul. 5, 2005

(54) PROTECTIVE DEVICE IN A CONNECTOR ARRANGEMENT FOR OPTICAL FIBERS

(75) Inventors: Carsten Buck, Heppenheim (DE); Michael Ferstl, Regensburg (DE); Stefan Loeffelholz, Lorsch (DE); Dirk Reifel, Eragny sur Oise (FR)

(73) Assignee: Tyco Electronics AMP GmbH (DE)

( * ) Notice: Subject to any disclaimer, the term of this patent is extended or adjusted under 35 U.S.C. 154(b) by 0 days.

(21) Appl. No.: 09/920,702

(22) Filed: Aug. 2, 2001

(65) Prior Publication Data

US 2004/0197053 A1 Oct. 7, 2004

(30) Foreign Application Priority Data

Aug. 8, 2000 (DE) ......................................... 100 38 685

(51) Int. Cl.[7] .............................. G02B 6/00; G02B 6/36
(52) U.S. Cl. ......................................... 385/77; 385/147
(58) Field of Search ........................ 385/52–78, 88–90, 385/147

(56) References Cited

U.S. PATENT DOCUMENTS

| 4,155,159 | A | | 5/1979 | Hogan et al. ................... 29/764 |
| 4,225,214 | A | * | 9/1980 | Hodge et al. ................... 385/68 |
| 5,142,598 | A | * | 8/1992 | Tabone ........................ 385/78 |
| 5,506,922 | A | * | 4/1996 | Grois et al. .................... 385/75 |
| 5,896,477 | A | | 4/1999 | Stephenson et al. ............ 385/53 |
| 6,315,461 | B1 | * | 11/2001 | Cairns ......................... 385/56 |

FOREIGN PATENT DOCUMENTS

EP         0 613 030 A2     8/1994     ............ G02B/6/38

* cited by examiner

Primary Examiner—Akm Enayet Ullah (57) ABSTRACT

A plug for a connector arrangement consisting of a plug and an associated mating plug, has a housing which has at least one axial receiver for an optical fiber and a protective device movably mounted in the housing for protecting the optical fiber. The protective device according to the invention is designed as a slide which can be moved axially to the receiver and the slide has a aperture for the optical fiber and/or the receiver.

17 Claims, 11 Drawing Sheets

PROTECTIVE DEVICE IN A CONNECTOR ARRANGEMENT FOR OPTICAL FIBERS

FIELD OF THE INVENTION

The invention relates to a connector arrangement with a plug and an associated mating plug.

BACKGROUND

In addition to connector arrangements with terminal contacts for copper wires, connectors are also known which couple optical fibers to one another. Optical fibers are often used for data transmission when large amounts of data are to be transmitted at high transmission rates or parallel transmission of data on a plurality of channels is desired. The connector arrangement couples an optical fiber and an optical element, for example a further optical fiber or a diode, to one another and conventionally consists of a plug and an associated mating plug.

Optical fibers are also used, for example, in motor vehicles because of their low sensitivity to interference from electromagnetic radiation. During assembly, maintenance or repair where a plug is in an unmated condition there are various protective devices which may be applied to the plug to protect the optical fibers.

A known protective device for a connector arrangement is, for example, a protective cap which is removed before connection of the plug to the mating plug. Removal of the cap involves an additional step in the assembly of the connector arrangement and also leads to storage problems with the cap.

A further protective device is known from U.S. Pat. No. 5,506,922 in the form of a protective flap which can be opened for connection to the optical fiber. The flap opens upon connection of the plug to the mating plug and is a complex mechanism which is susceptible to defects.

A further common protective device is a collar arranged about the optical fiber which protects the optical fiber and upon connection to the mating plug is connected to the optical element thereof. The collar is, however, only suitable for connecting optical fibers to one another because in the event of connection to a different optical element, the diameter of the collar is too large to obtain a protective effect. A collar can only be designed for connection to an optical element of a certain size.

SUMMARY

An object of the present invention is to provide a simple protective device for a plug in a connector arrangement which is only infrequently susceptible to defects.

This and other objects are achieved by providing a plug according to the invention for a connector arrangement. The plug and an associated mating plug have a housing which has at least one axial receiver for an optical fiber and a protective device movably mounted in the housing for protecting the optical fiber. The protective device is designed as a slide which can be moved axially to the receiver and has a through aperture for the optical fiber and/or the receiver.

The protective device can therefore be suitably displaced for a connection to the optical element of the mating plug, wherein the through aperture makes the optical fiber receiver accessible for connection. The slide is also designed simply so as to be only infrequently susceptible to defects.

The movement direction of the slide preferably corresponds to a plug-in direction in which the plug and mating plug are connected to one another, as a result of which the necessary mechanisms are simplified and therefore have fewer sources of error.

According to a preferred embodiment of the plug, in a unmated state the slide is located in a starting position in front of the front end of the receiver and in the mated state, the front end of the receiver projects through the aperture. In its starting position, the slide therefore protects the optical fiber in the receiver, but exposes it in the mated state for connection with the optical element the mating plug.

BRIEF DESCRIPTION OF THE DRAWINGS

The invention will be described in more detail hereinafter with the aid of preferred embodiments and with reference to the attached drawings.

DETAILED DESCRIPTION OF THE INVENTION

Figure 1:
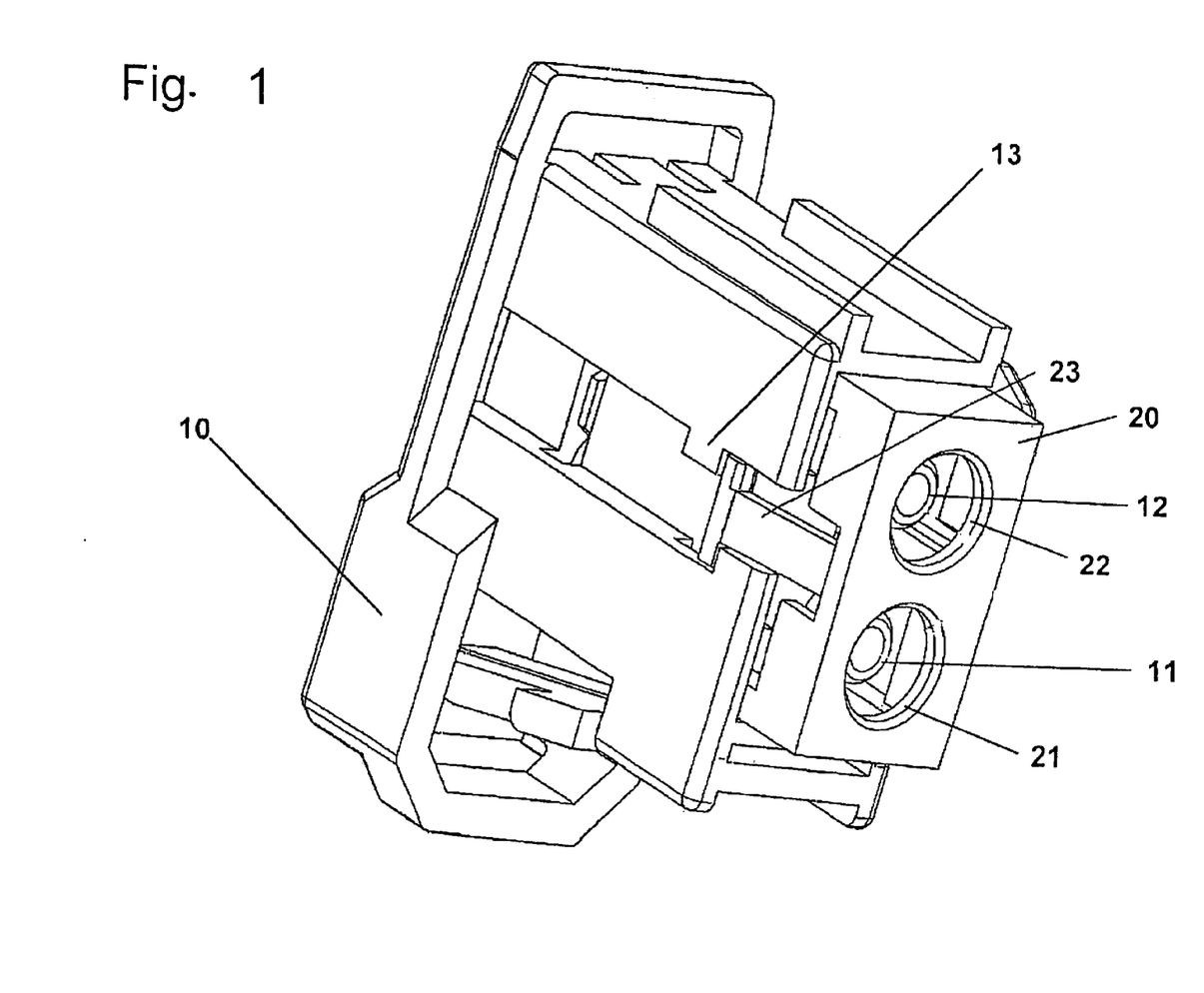
FIG. 1 is a three-dimensional view of a preferred embodiment of the plug according to the invention.
Figure 2:
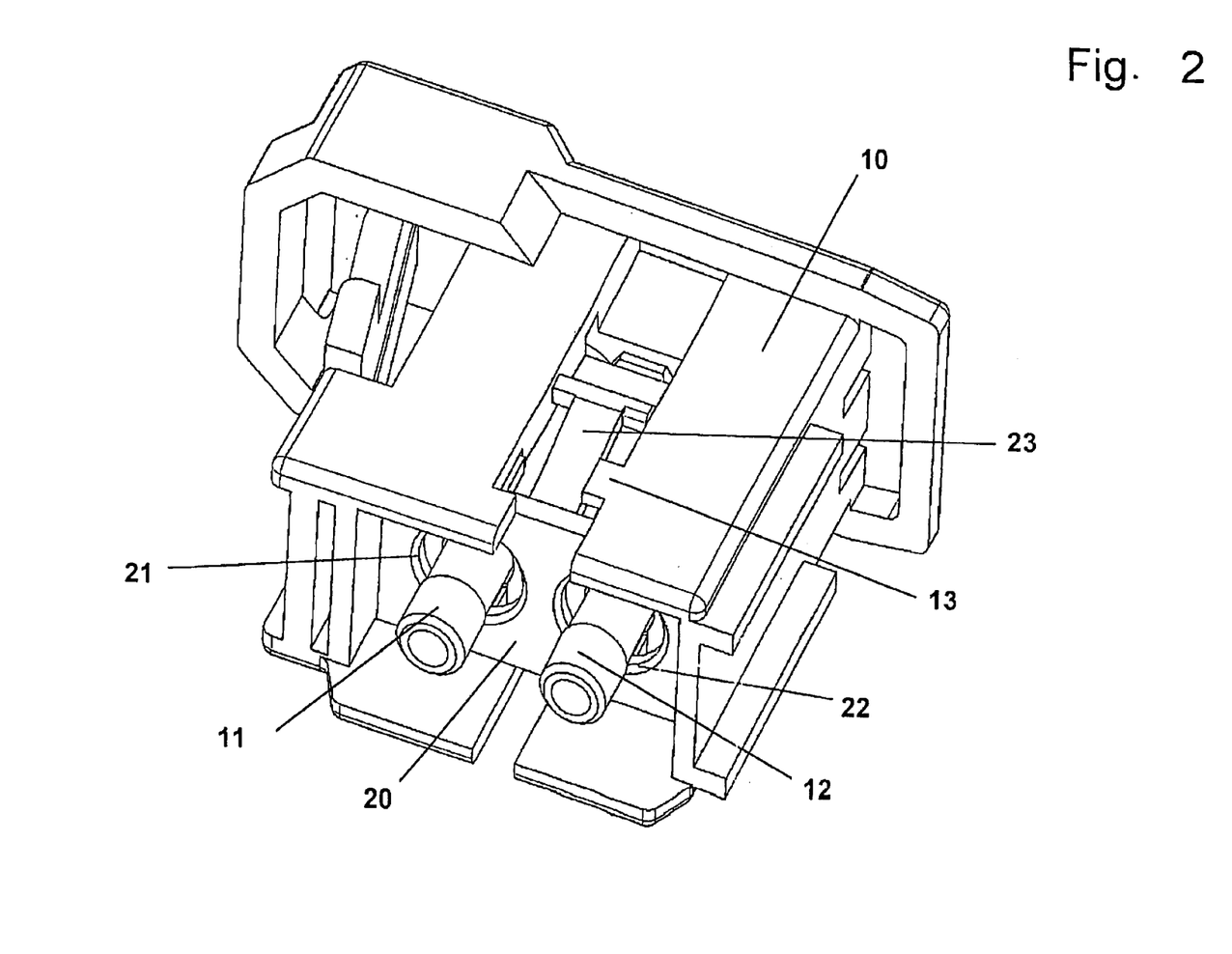
FIG. 2 is a three-dimensional view the plug from FIG. 1 with a slide in the plugged-in connector arrangement.
Figure 3:
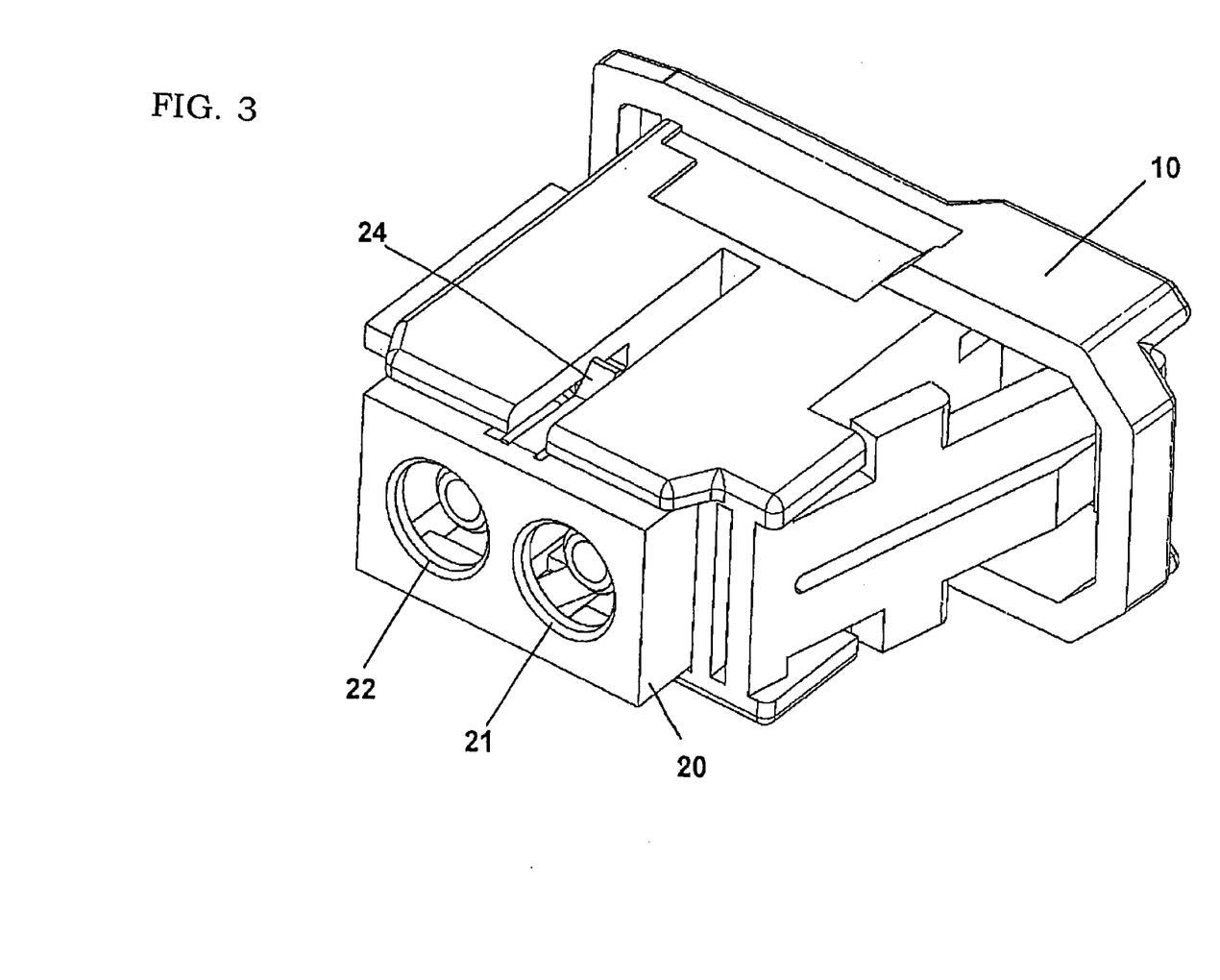
FIG. 3 is a three-dimensional view of the plug from FIGS. 1 and 2, which shows a return device.

FIGS. 1 to 3 show a preferred embodiment of the invention. A plug of a connector arrangement in FIG. 1 has a housing 10 which has two receivers 11 and 12 for optical fibers. A movably mounted protective device to protect the optical fibers which can be inserted into the receivers 11 and 12 is designed as a slide 20 in the housing 10. The slide 20 can be moved axially with respect to the receivers 11 and 12 and has apertures 21 and 22 for the optical fibers and/or the receivers.

The movement direction of the slide 20 corresponds to a plug-in direction in which the plug and the mating plug, not shown in this figure, are connected to one another. As FIG. 1 shows, the slide 20 is arranged in its starting position in front of the front end of the receiver.

The plug housing and the slide can be made, for example, from plastic material, ceramics or metal.

FIG. 2 shows the plug from FIG. 1 with the slide 20 in a plugged-in or mated condition, wherein the slide 20 is moved with respect to the housing 10 and its receivers 11 and 12 projecting through the apertures 21 and 22.

Individual optical fibers or a plurality of optical fibers can be connected to a plug utilising this arrangement. A plug which can be connected to a mating plug in which the most varied of optical elements, for example a further optical fiber, a lens, a filter, a diode or an end piece is mounted, can also be produced.

In order to prevent the slide 20 from being pushed unintentionally into the housing 10, a locking device is provided. As can be seen from FIGS. 1 and 2, the locking device is designed as a locking tongue 23 of the slide 20. A projection of the locking tongue 23 rests on a housing projection 13 to prevent movement of the slide 20 into the housing 10. The locking tongue 23 is arranged so as to extend obliquely in a direction from the slide 20 towards the outside to the housing 10, so that it can be pressed by a complimentary part of the mating plug (not shown) in the direction of the slide 20 to release the lock. In the mated state, the projection of the locking tongue 23 is arranged behind the housing projection 13, as shown in FIG. 2.

FIG. 3 shows a further preferred embodiment of the plug. The slide 20 with its through apertures 21 and 22 is movably mounted in the housing 10. It can be returned into the starting position by a return device, designed as a catch 24, upon detachment of the connector arrangement from a correspondingly shaped part of the mating plug. The catch 24 is designed in such a way that movement of the mating plug is not hindered during connection and detachment of the connector arrangement.

Figure 4:
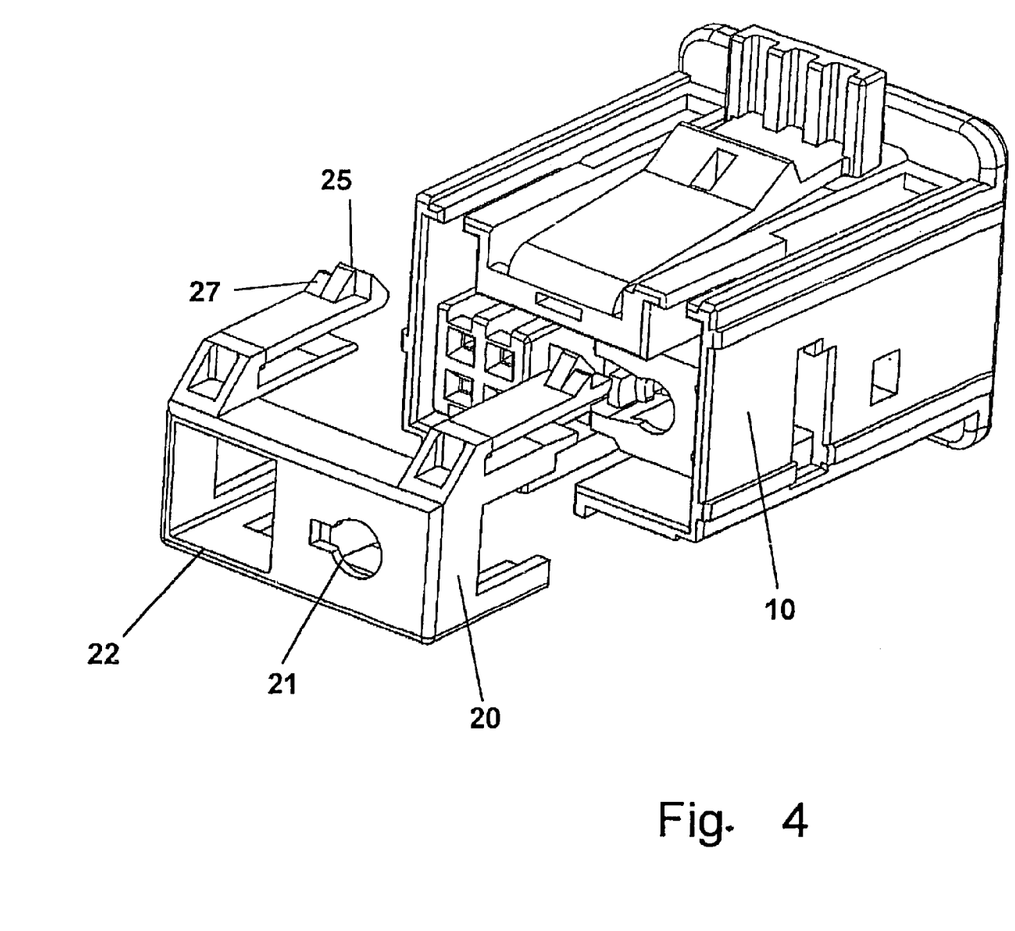
FIG. 4 is a three-dimensional exploded drawing of a further embodiment of the plug according to the invention.

FIG. 4 shows a housing 10 and a slide 20 with apertures 21 and 22 for a preferred embodiment of the invention. The aperture 21 is provided for a receiver of an optical fiber. The aperture 22 on the other hand is provided for electrical, contact units. A locking projection 27 and a two-part latch 25 are also formed on the slide 20, the function of which will be described hereinafter.

The slide 20 is preferably produced as a separate part and inserted into the housing 10.

Figure 5:
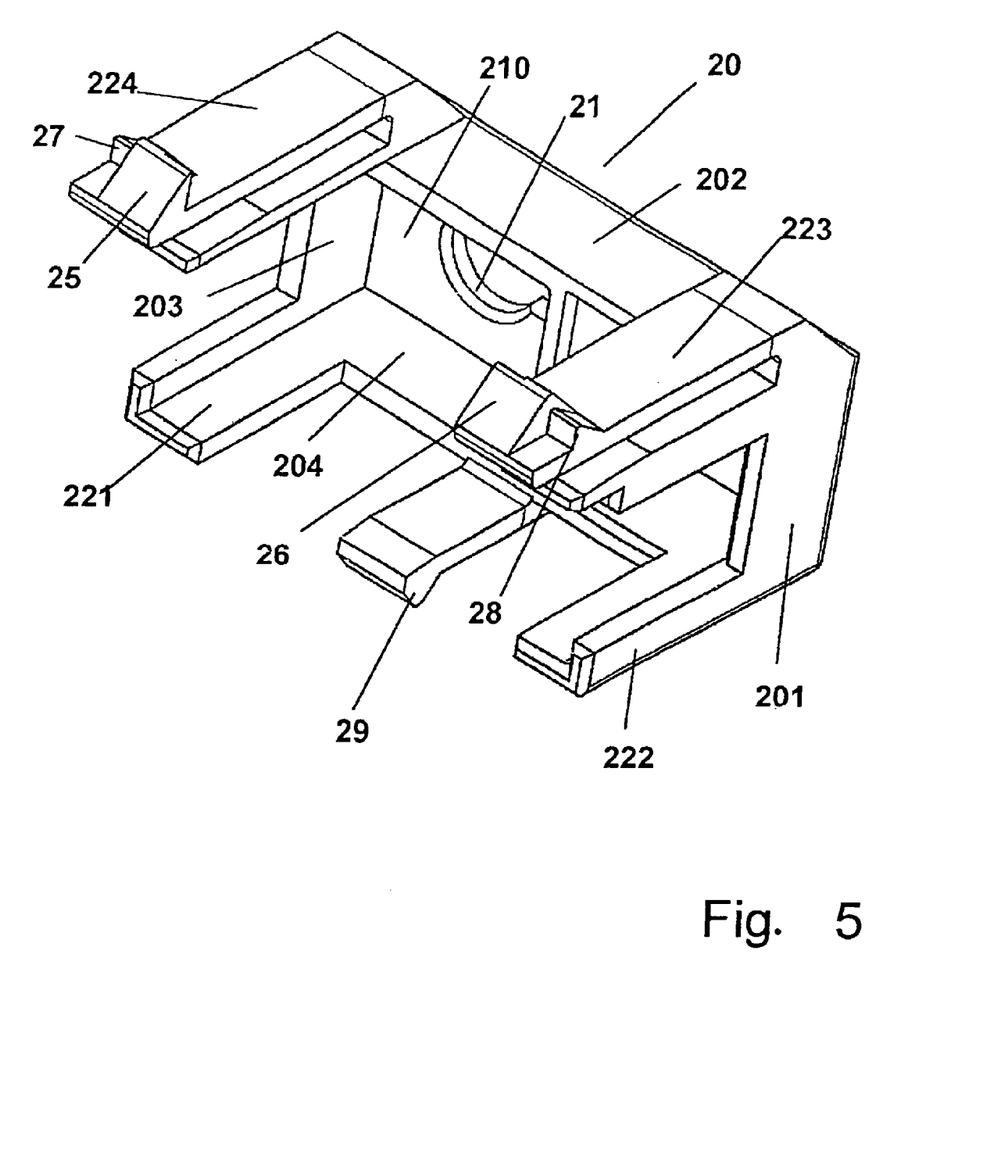
FIG. 5 is a three-dimensional view of the slide from FIG. 4.

FIG. 5 shows the slide 20 having an end face 210, side walls 201 to 204 and guide elements 221 to 224. In addition to the aperture 21, additional parts 25 to 28 of a locking device and a latch nose 29 are shown, the function of which will be described with reference to FIGS. 9 to 11.

Figure 6:
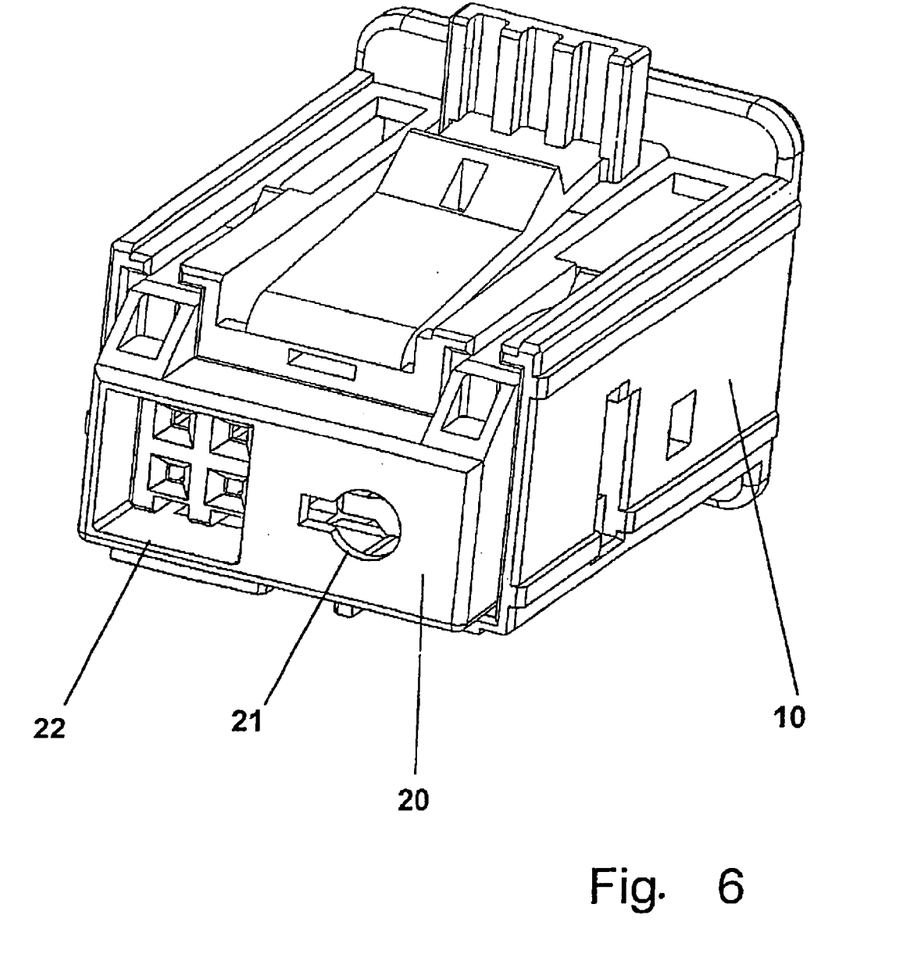
FIG. 6 is a three-dimensional view of the plug from FIG. 4 with the plug in an unmated position.

FIG. 6 shows the plug of the connector arrangement from FIG. 4 in its unmated state wherein the slide 20 with its openings 21 and 22 are arranged in a starting position on the housing 10.

Figure 7:
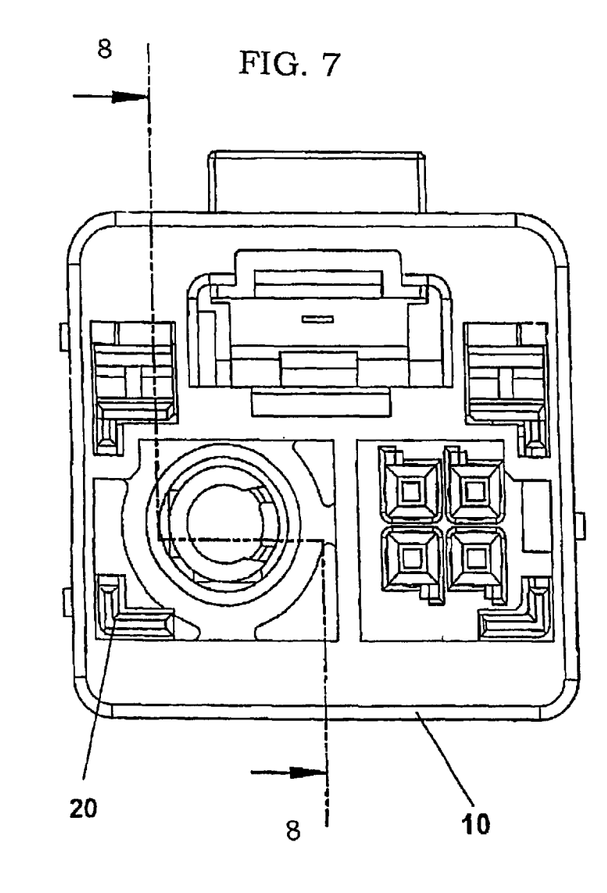
FIG. 7 is an end view of the plug from FIG. 4.
Figure 8:
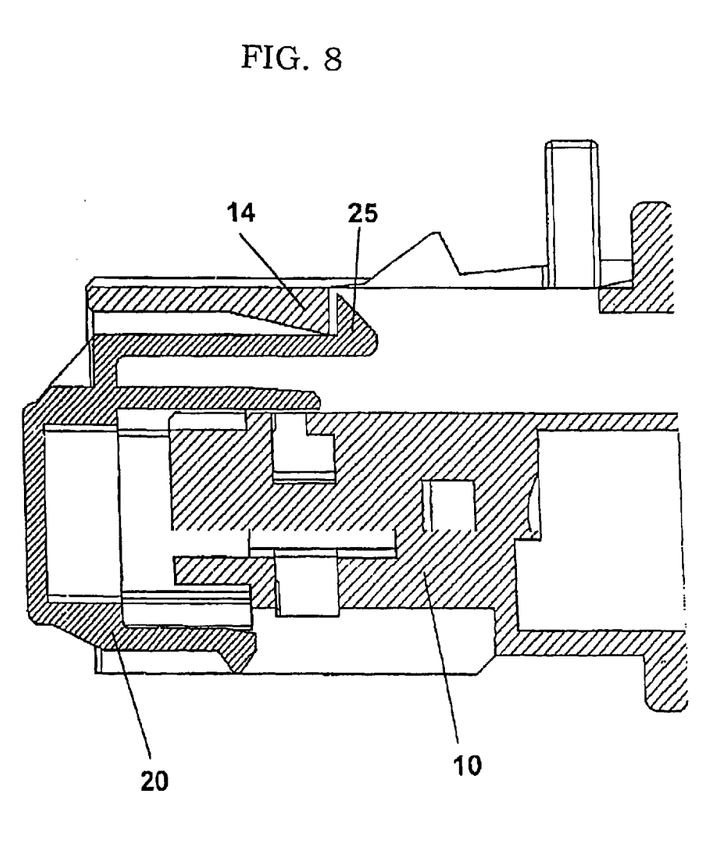
FIG. 8 is a section view of the plug taken along the line 8—8 of FIG. 7.

FIG. 8 shows a sectional drawing along a section 8—8 of FIG. 7 illustrating how the slide 20 is held in the housing 10. The slide 20 is locked by a housing latch 14 and a part of the latch 25 designed as a projection in the housing 10.

Figure 9:
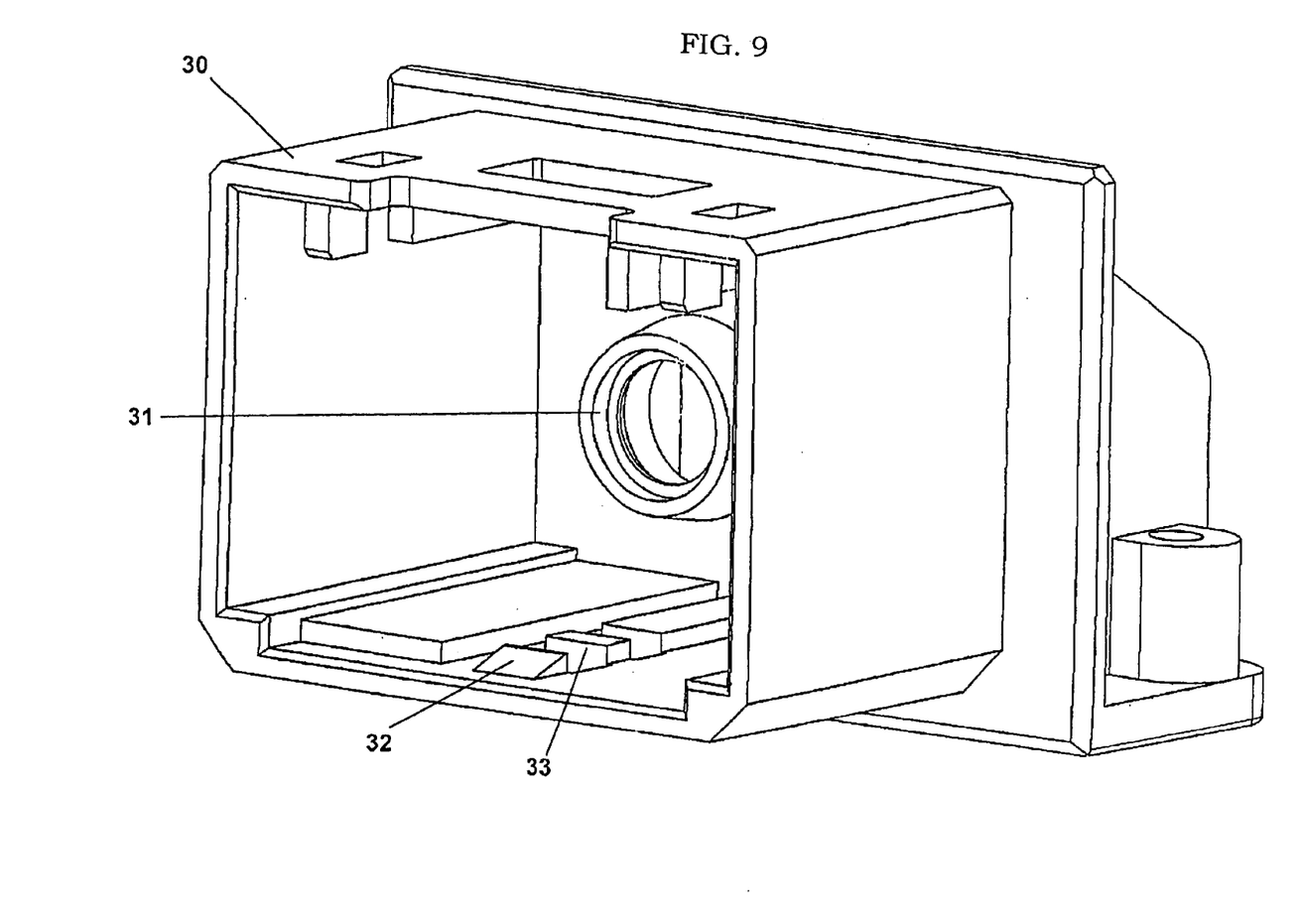
FIG. 9 is a three-dimensional view of a mating plug for a plug according to the invention.
Figure 10:
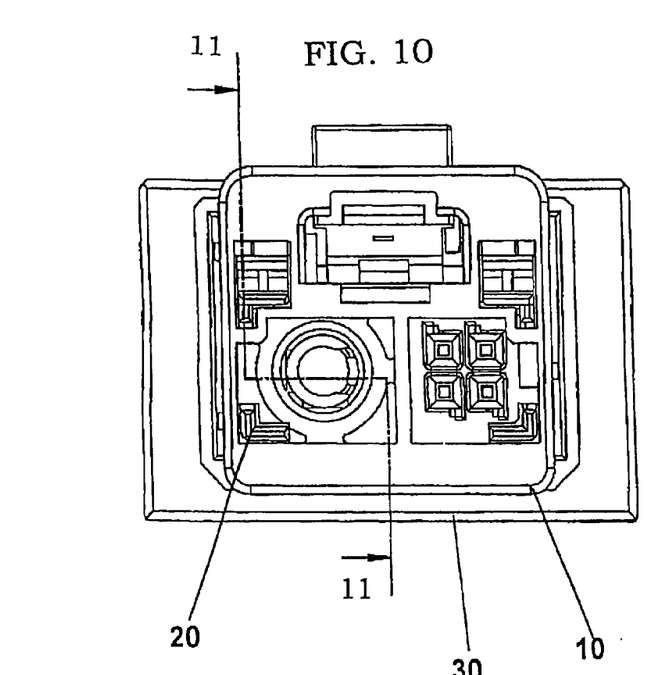
FIG. 10 is an end view of the plug and mating plug in engagement during a mating cycle.
Figure 11:
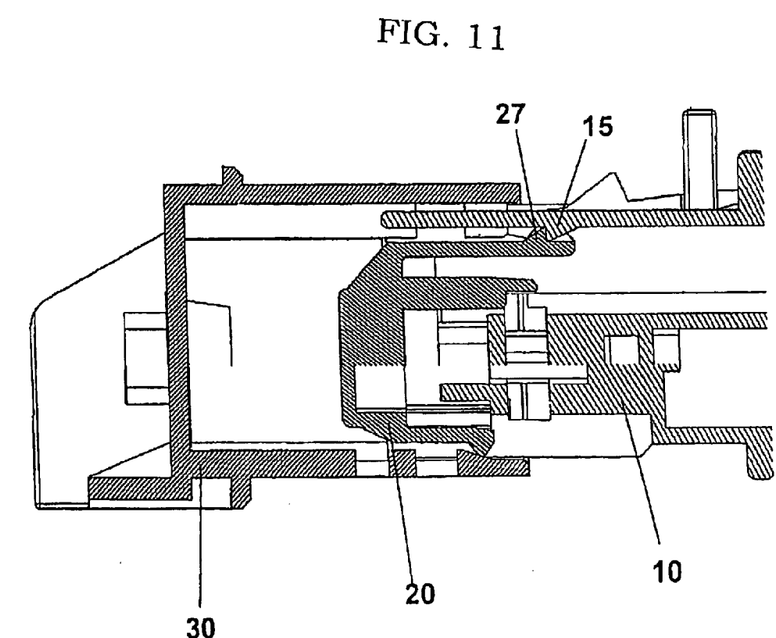
FIG. 11 is a sectional view taken along the line 11—11 of FIG. 10.

A mating plug for a connector arrangement with an associated plug according to FIG. 6 is shown in FIG. 9. The mating plug 30 comprises a receiver 31 for an optical fiber and the optical fiber of the plug or its receiver, and a latch 32 and a projection 33. The mating plug can, in addition to the mating unit, not visible in FIG. 9, for the electrical contact unit of the plug from FIG. 6, be wider in design, in particular with respect to the receiver 31.

FIGS. 10 to 15 show sectional drawings of a mating progression of the connector arrangement with the plug, consisting of the housing 10 and the slide 20, and the mating plug 30. The states shown in the figures are assumed during connection of the mating plug 30 to the plug.

In FIG. 9, the plug is attached to the mating plug 30, but the slide 20 is still locked in the housing 10. The slide 20 is blocked by its locking projection 27 with a housing projection 15.

Figure 12:
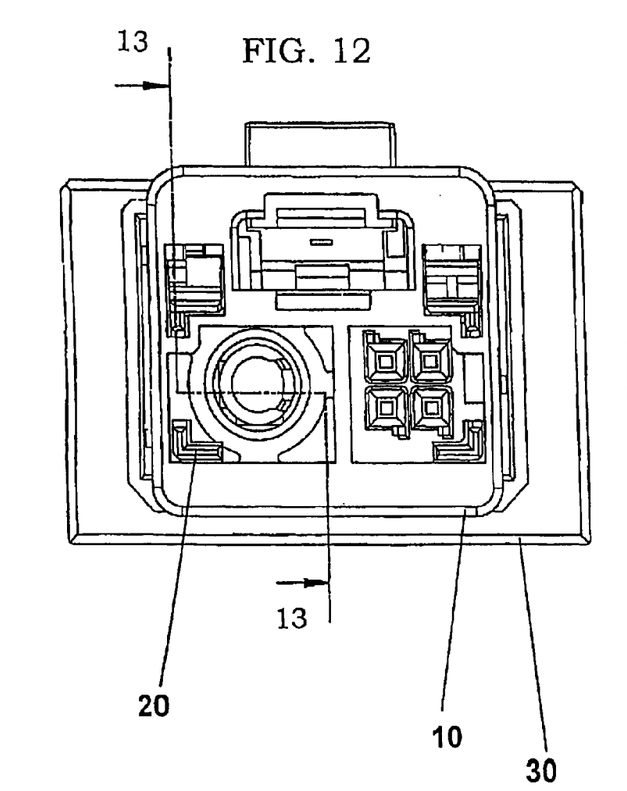
FIG. 12 is an end view of the connector arrangement from FIG. 11.
Figure 13:
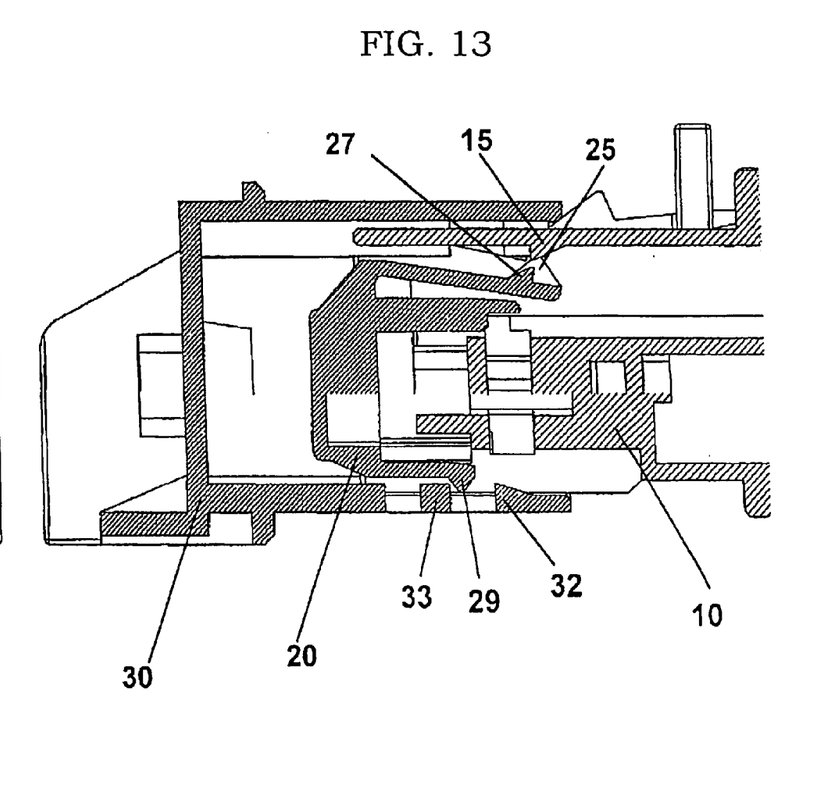
FIG. 13 is a sectional view taken along the line 13—13 of FIG. 12 illustrating detachment of the locking device during the mating cycle.
Figure 15:
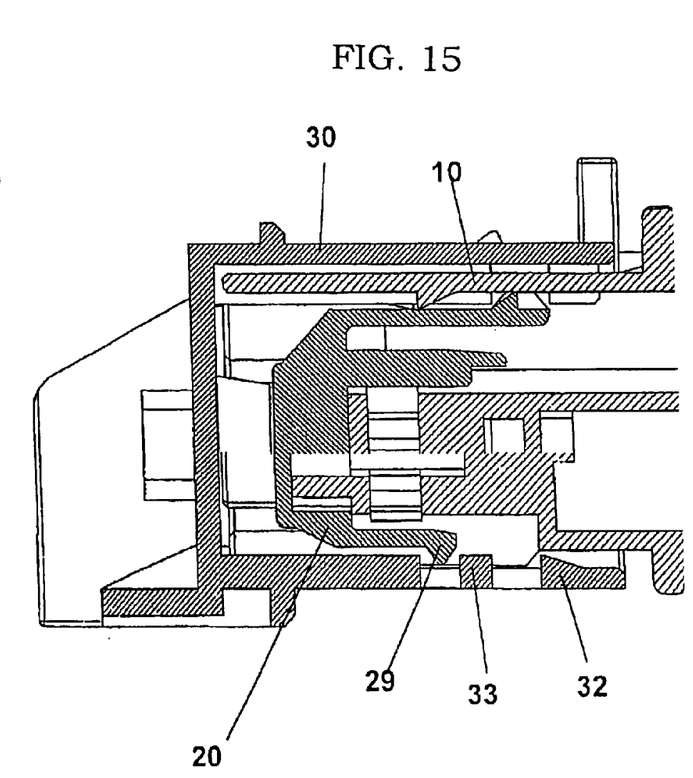
FIG. 15 is a sectional view taken along the line 15—15 of FIG. 14 showing the fully mated position.

In FIGS. 12 and 15 the mating plug is connected to the plug to the extent that locking is released. The movement between plug and mating plug 30 is converted via an oblique part of the latch 25 for release of the locking between the locking projection 27 and the housing projection 15. The latch 29 of the slide 20 is arranged in this state between the nose 32 and the projection 33 of the mating plug 30.

Figure 14:
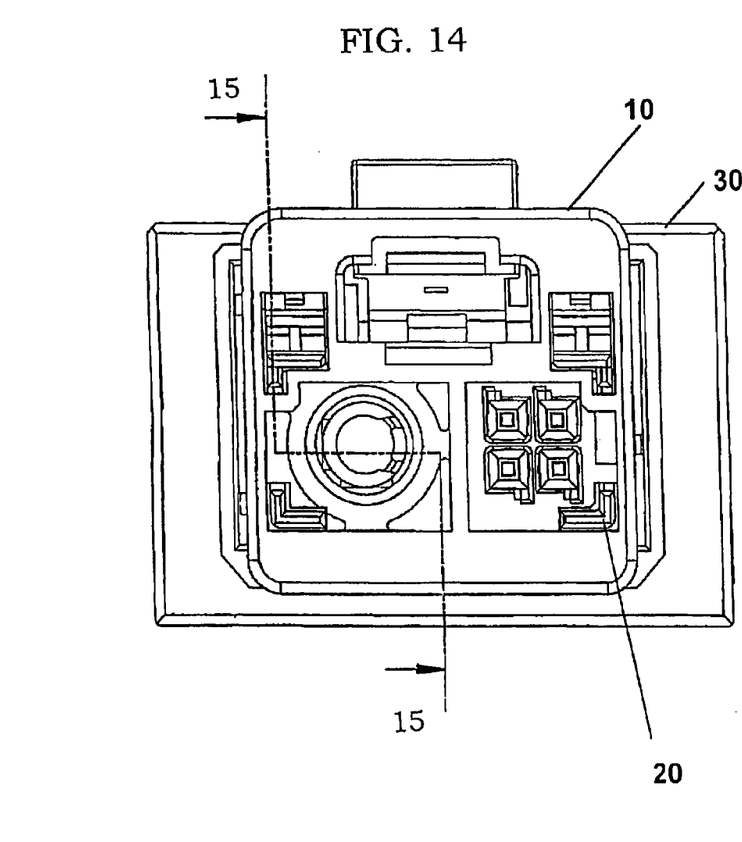
FIG. 14 is an end view of the connector arrangement from FIG. 9.

FIGS. 14 and 15 show the connector arrangement with plug and mating plug 30 in the mated state. The slide 20 is inserted into the housing 10 and the latch 29 is arranged in front of the projection 33. Upon a detachment of the connector arrangement, the projection 33 and the nose 32 return the slide 20 through the latch 29 into its starting position.

The configurations and properties of the embodiments described can also be readily combined with one another.

What is claimed is:

1. A plug for a connector arrangement consisting of a plug and an associated mating plug, comprising:
   a housing which has at least one axial receiver for an optical fiber;
   a protective device movably mounted in the housing for protecting the optical fiber;
   the protective device is a slide which can be moved axially to the receiver and has an aperture for the optical fiber and/or the receiver, the slide is arranged in a starting position in front of the front end of the receiver in an unmated state and the front end of the receiver projects through the aperture in a mated state of the connector arrangement.

2. The plug according to claim 1, wherein the movement direction of the slide corresponds to a plug-in direction in which the plug and mating plug are connected to one another.

3. The plug according to claim 1, wherein the slide is produced as a part separate from the housing which can be inserted into the housing.

4. The plug according to claim 1, wherein the slide is designed in the shape of a trough with a front end and side wall and guide elements which extend from the front end in the direction of the housing.

5. The plug according to claim 1, wherein the housing comprises two or more axial receivers for a plurality of optical fibers, wherein one optical fiber respectively can be arranged in each receiver.

6. The plug according to claim 1, further comprising a locking device which restricts movement of the slide in such a way that the protective function of the slide is retained if the plug is not connected to the mating plug.

7. The plug according to claim 6, wherein the locking device is released upon a connection to the mating plug to release the axial movement of the slide.

8. The plug according to claim 6, wherein the locking device comprises a locking projection which rests against a housing projection, so that the projections can be moved toward one another to release the locking.

9. The plug according to claim 6, wherein the locking device or the housing contain a part which extends obliquely to the movement direction of the slide and which converts the movement of the mating plug upon connection into a movement to release the lock.

10. The plug according to claim 1, further comprising a return device which returns the slide into the slide starting position upon detachment of the mating plug from the plug.

11. The plug according to claim 10, wherein the return device comprises a latch which is arranged on the slide and rests with a correspondingly shaped projection on the mating plug when the connector arrangement is detached.

12. A plug for a connector arrangement consisting of a plug and an associated mating plug, comprising:
- a housing which has at least one axial receiver for an optical fiber;
- a protective device movably mounted in the housing for protecting the optical fiber;
- the protective device is a slide which can be moved axially to the receiver and has an aperture for the optical fiber and/or the receiver; and,
- a locking device which restricts movement of the slide in such a way that the protective function of the slide is retained if the plug is not connected to the mating plug.

13. The plug according to claim 12, wherein the locking device is released upon a connection to the mating plug to release the axial movement of the slide.

14. The plug according to claim 12, wherein the locking device comprises a locking projection which rests against a housing projection, so that the projections can be moved toward one another to release the locking.

15. The plug according to claim 12, wherein the locking device or the housing contain a part which extends obliquely to the movement direction of the slide and which converts the movement of the mating plug upon connection into a movement to release the lock.

16. The plug according to claim 12, further comprising a return device which returns the slide into the slide starting position upon detachment of the mating plug from the plug.

17. The plug according to claim 16, wherein the return device comprises a latch which is arranged on the slide and rests with a correspondingly shaped projection on the mating plug when the connector arrangement is detached.

* * * * *